(12) United States Patent
Papa et al.

(10) Patent No.: US 12,293,101 B2
(45) Date of Patent: May 6, 2025

(54) DATA RELOCATION OPERATION TECHNIQUES

(71) Applicant: Micron Technology, Inc., Boise, ID (US)

(72) Inventors: Paolo Papa, Naples (IT); Luigi Esposito, Naples (IT); Massimo Iaculo, Caserta (IT); Giuseppe D'Eliseo, Caserta (IT); Alberto Sassara, Naples (IT); Carminantonio Manganelli, San Giorgio del Sannio (IT); Salvatore Del Prete, Naples (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/423,018

(22) Filed: Jan. 25, 2024

(65) Prior Publication Data

US 2024/0272820 A1  Aug. 15, 2024

Related U.S. Application Data

(63) Continuation of application No. 17/580,296, filed on Jan. 20, 2022, now Pat. No. 11,907,556.

(Continued)

(51) Int. Cl.
*G06F 12/00* (2006.01)
*G06F 3/06* (2006.01)
(Continued)

(52) U.S. Cl.
CPC ............ *G06F 3/064* (2013.01); *G06F 3/0604* (2013.01); *G06F 12/0246* (2013.01);
(Continued)

(58) Field of Classification Search
CPC .... G06F 3/064; G06F 3/0604; G06F 12/0246; G06F 12/0646; G06F 2212/1024;
(Continued)

(56) References Cited

U.S. PATENT DOCUMENTS 8,407,449 B1   3/2013   Colon et al.
2012/0265925 A1  10/2012  Miura
(Continued)

FOREIGN PATENT DOCUMENTS

| KR | 10-2019-0067938 A | 6/2019 |
| KR | 10-2020-0020464 A | 2/2020 |
| KR | 10-2021-0013656 A | 2/2021 |

OTHER PUBLICATIONS

Korean patent office, "KR Office Action," issued in connection with Korean Patent Application No. 10-2022-0016004 dated Mar. 11, 2024 (21 pages) (11 pages of English Translation and 10 pages of Original Document).

*Primary Examiner* — John A Lane
(74) *Attorney, Agent, or Firm* — Holland & Hart LLP

(57) ABSTRACT

Methods, systems, and devices for data relocation operation techniques are described. A memory system may include blocks of memory cells, for example, within a non-volatile memory device of the memory system. The memory system may identify a command to perform a data relocation operation associated with a block of memory cells and may select between a first procedure and a second procedure for performing the data relocation operation. The memory system may select between the first procedure and the second procedure based on whether one or more parameters associated with the data relocation operation satisfy a threshold. For example, the memory system may select the first procedure if the one or more parameters satisfy the threshold and may select the second procedure if the one or more (Continued)

parameters do not satisfy the threshold. The memory system may perform the data relocation operation using the selected procedure.

20 Claims, 5 Drawing Sheets

Related U.S. Application Data

(60) Provisional application No. 63/150,901, filed on Feb. 18, 2021.

(51) Int. Cl.
*G06F 12/02* (2006.01)
*G06F 12/06* (2006.01)

(52) U.S. Cl.
CPC .. *G06F 12/0646* (2013.01); *G06F 2212/1024* (2013.01); *G06F 2212/1044* (2013.01); *G06F 2212/657* (2013.01); *G06F 2212/7205* (2013.01)

(58) Field of Classification Search
CPC ....... G06F 2212/1044; G06F 2212/657; G06F 2212/7205
See application file for complete search history.

(56) References Cited

U.S. PATENT DOCUMENTS

| | | |
|---|---|---|
| 2013/0246716 A1 | 9/2013 | Kato et al. |
| 2014/0075095 A1 | 3/2014 | Manohar et al. |
| 2014/0189206 A1* | 7/2014 | Sinclair ............... G06F 12/0246 711/103 |
| 2017/0147209 A1* | 5/2017 | Lee ........................ G11C 29/52 |
| 2018/0129424 A1* | 5/2018 | Confalonieri ........... G06F 3/061 |
| 2020/0004673 A1 | 1/2020 | D'Eliseo et al. |
| 2020/0057725 A1 | 2/2020 | Cho et al. |
| 2020/0210330 A1 | 7/2020 | Muchherla et al. |
| 2020/0233585 A1 | 7/2020 | Confalonieri et al. |
| 2020/0264789 A1 | 8/2020 | Wen et al. |
| 2021/0117118 A1 | 4/2021 | Stoica et al. |
| 2022/0171533 A1* | 6/2022 | Yoon ..................... G06F 3/0619 |

* cited by examiner

DATA RELOCATION OPERATION TECHNIQUES

CROSS REFERENCE

The present application for patent is a continuation of U.S. patent application Ser. No. 17/580,296 by Papa et al., entitled "DATA RELOCATION OPERATION TECHNIQUES", filed Jan. 20, 2022, which claims priority to U.S. Provisional Patent Application No. 63/150,901 by Papa et al., entitled "DATA RELOCATION OPERATION TECHNIQUES", filed Feb. 18, 2021, each of which is assigned to the assignee hereof, and each of which is expressly incorporated by reference in its entirety herein.

FIELD OF TECHNOLOGY

The following relates generally to one or more systems for memory and more specifically to data relocation operation techniques.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
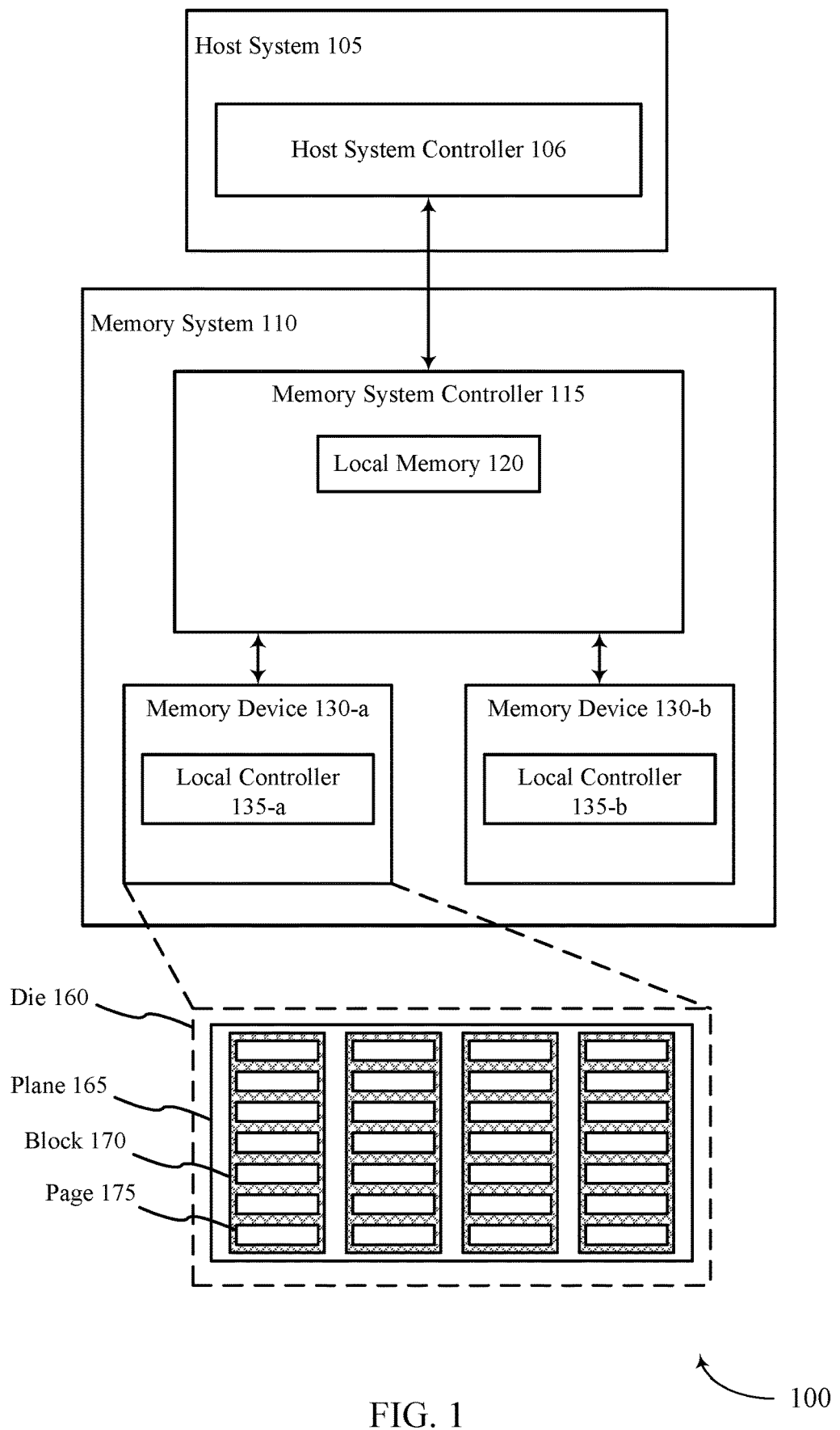
FIG. 1 illustrates an example of a system that supports data relocation operation techniques in accordance with examples as disclosed herein.

Memory devices of a memory system may store data at a corresponding physical address, where a physical address may identify a physical location of a corresponding memory cell within a memory device. The physical location of data within the memory device may change over time due to the memory device accommodating the writing of additional data, maintenance operations performed by the memory device (e.g., garbage collection operations), or for any number of other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory device may generate and maintain a mapping between the logical addresses associated with the data and the physical addresses of the memory cells at which the data is stored, which may support the memory device changing the physical addresses over time.

The memory system may perform a data relocation operation (e.g., a garbage collect operation, a dynamic wear leveling operation, reliability relocation operation, a protocol specific folding operation, a flush operation, a post-reflow relocation operation, or some other data relocation operation) to free, consolidate, or relocate storage space of the memory system. In some examples, a data relocation operation may be associated with a block of memory cells of the memory system. For example, in response to a command to perform the data relocation operation, the memory system may locate valid pages (i.e., pages that contain valid data) of the block of memory cells and write the valid pages to a new block of memory cells. Additionally, the memory system may update a mapping between logical addresses associated with the valid pages and physical addresses of memory cells of the new block at which the valid pages are stored. However, in some cases, the block of memory cells associated with the data relocation operation may include a relatively large quantity of valid pages (e.g., approximately 80 percent of the pages of the block of memory cells are valid pages, or some other percentage of pages of the block of memory cells are valid pages). Some procedures for performing the data relocation operation may increase latency and power consumption of the memory system due to locating the large quantity of valid pages and updating the mapping for each valid page written to the new block of memory cells. Thus, techniques to improve procedures for performing data relocation operations may be desired.

Techniques, systems, and devices are described herein for increasing data relocation operation performance by selecting different procedures for performing the data relocation operation based on or in response to one or parameters associated with the data relocation operation. For example, a memory system may identify a command to perform a data relocation operation associated with a block of memory cells. In response to identifying the command, the memory system may select between a sparse data relocation procedure and a dense data relocation procedure based on or in response to whether one or more parameters associated with the data relocation operation satisfy a threshold. For example, the memory system may select the dense data procedure if the one or more parameters satisfy the threshold (e.g., if a threshold percentage of pages of the block of memory cells are valid pages) and may select the sparse data procedure if the one or more parameters do not satisfy the threshold. The memory system may perform the data relocation operation using the selected procedure. In some examples, the dense data procedure may include processes to write valid pages and invalid pages of the block of memory cells to a new block of memory cells without updating a mapping that indicates relationships between logical addresses and physical addresses. Such processes may eliminate or reduce latency associated with locating valid pages of the block of memory cells and updating the mapping and thereby reduce the latency for performing the data relocation operation. In some cases, the dense data procedure may, as described herein, reduce latency and power consumption and increase memory system performance associated with performing data relocation operations.

Features of the disclosure are initially described in the context of systems as described with reference to FIG. 1. Features of the disclosure are described in the context a data scheme and a process flow as described with reference to FIGS. 2 and 3. These and other features of the disclosure are further illustrated by and described with reference to an apparatus diagram and a flowchart that relate to data relocation operation techniques as described with reference to FIGS. 4 and 5.

FIG. 1 illustrates an example of a system 100 that supports data relocation operation techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

In some examples, a set of one or more blocks 170 may be referred to as a virtual block. Each block 170 of the set of blocks 170 of the virtual block may include a quantity of pages 175. A pageline of the virtual block may refer to a single row of pages 175 of the virtual block. For example, a pageline corresponding to the first row of the virtual block may include the first page 175 of each block 170 of the set of blocks 170. A dynamic block may refer to a subset of pagelines of the virtual block.

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages 175 of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block 170 that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The memory system controller 115 or the local controller 135 may identify a command to perform a data relocation operation, which may be an example of one or more media management operations, wear-leveling operations, garbage collection operations, folding operations, or any combination thereof, as described herein. In some examples, the data relocation operation may be associated with a virtual block. Some procedures for performing the data relocation operation may include updating a mapping between logical addresses associated with the valid pages 175 of the virtual block and physical addresses of memory cells of a new virtual block at which the valid pages 175 are stored. However, in some cases, the virtual block may include a relatively large quantity of pages 175. Further, a relatively large percentage of pages 175 may be valid pages 175. Such procedures for performing the data relocation operation may increase latency and power consumption of the system 100 due to updating the mapping for each valid page 175.

To reduce latency and power consumption associated with performing data relocation operations, the memory system controller 115 or the local controller 135 may select a procedure from one or more procedures for performing a data relocation operation based on or in response to one or parameters associated with the data relocation operation. For example, the memory system controller 115 or the local controller 135 may identify a command to perform a data relocation operation associated with a dynamic block. In response to identifying the command, the memory system controller 115 or the local controller 135 may select between a sparse data relocation procedure and a dense data relocation procedure based on or in response to whether one or more parameters associated with the data relocation operation satisfy a threshold. For example, the memory system controller 115 or the local controller 135 may select the dense data procedure if the one or more parameters satisfy the threshold (e.g., if a threshold percentage of pages of the block of memory cells are valid pages) and may select the sparse data procedure if the one or more parameters do not satisfy the threshold. The memory system controller 115 or the local controller 135 may perform the data relocation operation using the selected procedure. In some examples, the dense data procedure may include processes to write valid pages and invalid pages of the block of memory cells to a new block of memory cells without updating the mapping, thereby eliminating or reducing latency associated with updating the mapping. Additionally, by selecting between the dense data relocation procedure and the sparse data relocation procedure at a dynamic block level, the memory system controller 115 and the local controller 135 may increase data relocation operation performance at the virtual block level.

The system 100 may include any quantity of non-transitory computer readable media that support data relocation operation techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

Figure 2:
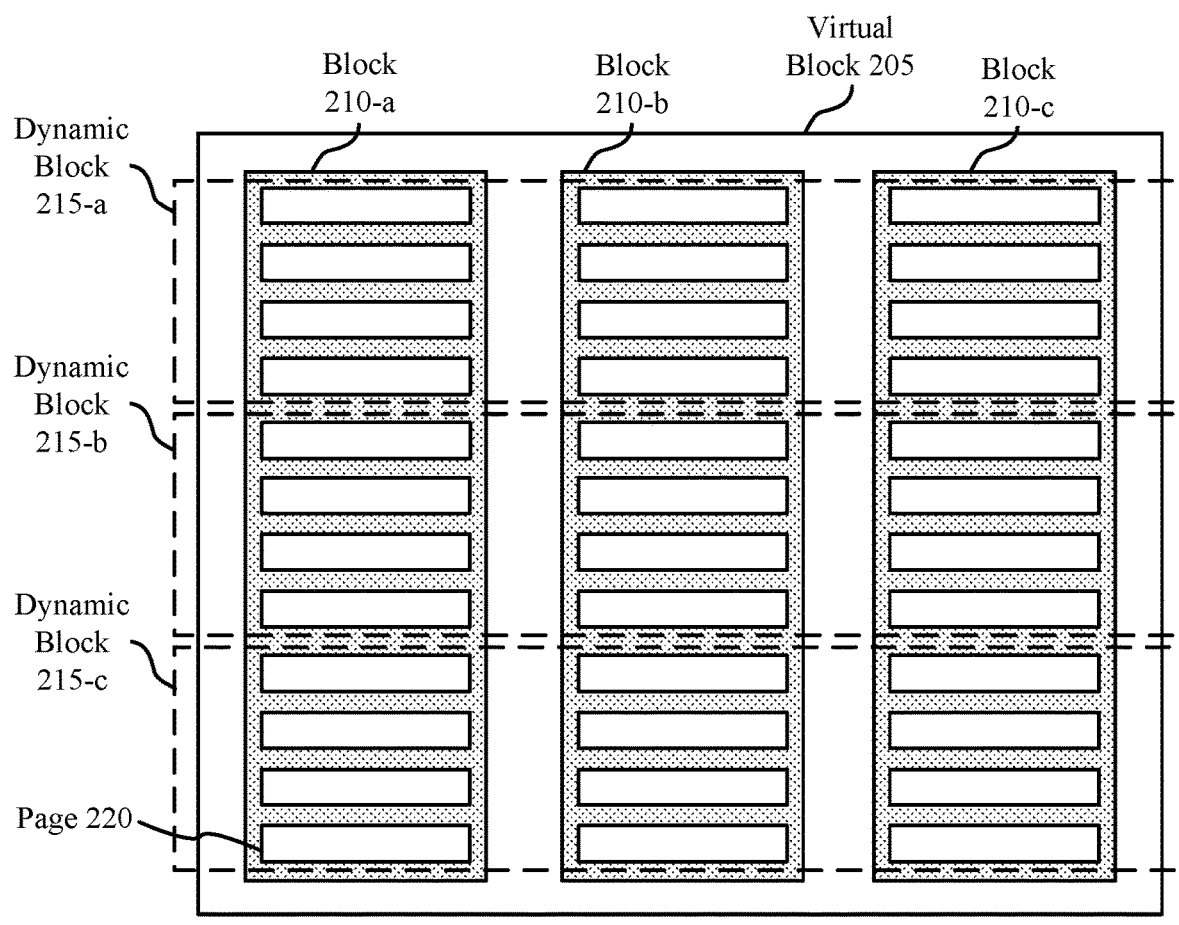
FIG. 2 illustrates an example of a data scheme that supports data relocation operation techniques in accordance with examples as disclosed herein.

FIG. 2 illustrates an example of a data scheme 200 that supports data relocation operation techniques in accordance with examples as disclosed herein. The data scheme 200 may be implemented by components of a system 100 as described with reference to FIG. 1. For example, the data scheme 200 may be implemented by a memory device of a memory system, such as a memory device 130, and a controller of a memory system or a memory device (or both) such as a memory system controller 115 or a local controller 135, as described with reference to FIG. 1. In some examples, the data scheme 200 may be a logical representation and organization of memory cells that is used by the controller to perform data relocation operations as described herein.

The data scheme 200 depicts a virtual block 205. The virtual block 205 may be a logical grouping of one or more blocks 210, where each block 210 may be an example of a block 170 as described with reference to FIG. 1. For example, the controller may group a block 210-*a*, a block 210-*b*, and a block 210-*c* and may refer to the group as a virtual block 205. The controller may assign an index to the virtual block 205, which the controller may use to locate the virtual block 205 and to access memory cells of the virtual block 205. For illustrative purposes, FIG. 2 depicts the virtual block 205 as including three blocks 210, however the principles disclosed herein may be adapted and applied for the virtual block 205 to include any quantity of blocks 210.

Each of the blocks 210-*a*, 210-*b*, and 210-*c* may include a quantity of pages 220, which may be examples of pages 175 as described with reference to FIG. 1. A pageline of the virtual block 205 may refer to a single row of pages 220 of the virtual block 205. For example, a pageline corresponding to the top row of the virtual block 205 may include the top page 220 of the block 210-*a*, the block 210-*b*, and the block 210-*c*. A dynamic block 215 may refer to a logical grouping of pagelines of the virtual block 205. For example, a dynamic block 215-*a* may include the first four pagelines of the virtual block 205; a dynamic block 215-*b* may include the next four pagelines of the virtual block 205; and a dynamic block 215-*c* may include the last four pagelines of the virtual block 205. In some examples, a quantity of pagelines included in a respective dynamic block 215 may be pre-configured. In some other examples, the controller may configure the quantity of pagelines included in a respective dynamic block 215. The controller may assign an index to each dynamic block 215, which the controller may use to locate a respective dynamic block 215 and to access memory cells of the respective dynamic block 215.

The controller may generate, maintain, and store a first mapping that maps indices of the dynamic blocks 215 to corresponding virtual blocks 205. For example, an entry of the first mapping that maps the dynamic block 215-*a* to the virtual block 205 may include a first index associated with the dynamic block 215-*a*, a second index associated with the virtual block 205, and an offset of the dynamic block 215-*a* within the virtual block 205. Accordingly, by reading the entry of the first mapping, the controller may determine the virtual block 205 in which the dynamic block 215-*a* is located as well as the position of the dynamic block 215-*a* within the virtual block 205. In some examples, the first mapping may be referred to as a dynamic block array table.

The controller may generate, maintain, and store a second mapping that indicates relationships between logical addresses and corresponding physical addresses. For example, an entry of the second mapping may map a logical address of a page 220 to a corresponding physical address of the page 220. Accordingly, by reading the entry of the second mapping, the controller may determine the physical address of a page 220. In some examples, the second mapping may be an example a physical pointer table (PPT) that maps logical addresses (e.g., LBAs) to corresponding physical addresses of a non-volatile memory device (e.g., a memory device 130, a NAND device, or some other non-volatile memory device) coupled with the controller. In some cases, the second mapping may be an example an L2P mapping table. In some examples, to update the second mapping (e.g., if data contained in a page 220 is written to a different page 220), the controller may load at least a portion of the second mapping that includes an entry to be updated into a volatile memory device of the memory system (e.g., a local memory 120, a memory device 130 including volatile memory cells), update the entry, and unload the portion of the second mapping to a non-volatile memory device of the memory system (e.g., a memory device 130 including non-volatile memory cells).

The controller may identify a command to perform a data relocation operation associated with a dynamic block 215 and may select between a dense data relocation procedure and a sparse data relocation procedure to perform the data relocation operation. To perform the data relocation operation using the dense data relocation operation, the controller may read data stored at the associated dynamic block 215 and write the data to a second dynamic block 215 (e.g., of a different virtual block 205). For example, if the data relocation operation is associated with the dynamic block 215-*a*, the controller may read the data stored in each of the pages 220 included in the dynamic block 215-*a* and may write the data to pages 220 of the second dynamic block 215. In some examples, the dynamic block 215-*a* may include one or more of pages 220 that contain valid data and one or more pages 220 that contain invalid data. Here, the controller may read both the pages 220 containing valid data and the pages 220 containing invalid data and may write both the valid data and the invalid data to the second dynamic block 215. In some examples, the controller may write the data read from the dynamic block 215-*a* to the second dynamic block 215 in a same order that the data was written to the dynamic block 215-*a*. In other words, performing the data relocation operation using the dense data relocation procedure may include copying the dynamic block 215-a to the second dynamic block 215.

Additionally, to perform the data relocation operation using the dense data procedure, the controller may update the first mapping to indicate an updated location of the associated dynamic block 215 and may refrain from updating the second mapping. For example, the controller may update an entry of the first mapping associated with the dynamic block 215-a. To update the entry of the first mapping, the controller may update the second index of the entry to indicate a virtual block 205 associated with the second dynamic block 215 and may update the offset to indicate a location of the dynamic block 215-a within the virtual block 205. Because the second dynamic block 215 is a copy of the dynamic block 215-a (e.g., the dynamic block 215-a changes locations), the controller may refrain from updating the second mapping. Instead, the controller may subsequently use the updated first mapping (e.g., in conjunction with the non-updated second mapping) to determine the physical address of a page 220 of the second dynamic block 215.

Alternatively, to perform the data relocation operation using the sparse data relocation procedure, the controller may determine pages 220 of a dynamic block 215 associated with the data relocation procedure that contain valid data and may write the pages containing valid data to a second dynamic block 215 (e.g., of a different virtual block 205). For example, if the data relocation operation is associated with the dynamic block 215-b, the controller may determine which pages 220 included in the dynamic block 215-b contain valid data and may write pages 220 containing valid data to the second dynamic block 215. Additionally, the update the second mapping to map the logical addresses of the pages 220 written to the second dynamic block 215 to corresponding physical addresses of the second dynamic block 215.

The dense data relocation procedure may reduce latency associated with performing a data relocation operation compared to using the sparse data relocation procedure. For example, a first latency associated with performing the data relocation operation using the dense data relocation procedure may be estimated (e.g., calculated) using the following equation:

$$L_1 = C_I * (t_{DL} + t_{DF}) \quad (1)$$

where $L_1$ is the first latency, $C_I$ is a quantity of pages 220 that are copied to a second dynamic block 215 (e.g., the quantity of pages 220 included in the dynamic block 215-a), $t_{DL}$ is an amount of time to load the data read from a dynamic block 215 to a volatile memory device, and $t_{DF}$ is an amount of time to flush the data from the volatile memory device. Additionally, a second latency associated with performing the data relocation operation using the sparse data relocation procedure may be estimated (e.g., calculated) using the following equation:

$$L_2 = T * [t_{TL} + M * (t_{TS} + t_{DL}) + t_{TU} + t_{TF}] + C_{std} * t_{DF} \quad (2)$$

where $L_2$ is the second latency, T is a quantity of portions of the second mapping to be loaded/unloaded from the volatile memory device, $t_{TL}$ is an amount of time to load a portion of the second mapping, M is an average quantity of logical addresses associated with valid pages per portion of the second mapping, $t_{TS}$ is an amount of time to locate a portion of the second mapping, $t_{DL}$ is an amount of time to load the data read from a dynamic block 215 to the volatile memory device, $t_{TU}$ is an amount of time to update a portion of the second mapping loaded into the volatile memory device, $t_{TF}$ is an amount of time to unload a portion of the second mapping, $C_{std}$ is a quantity of pages 220 that are copied to a second dynamic block 215 (e.g., the quantity of pages 220 included in the dynamic block 215-b that contain valid data), and $t_{DF}$ is an amount of time to flush the data from the volatile memory device.

As the values of T and M increase, the second latency associated with the sparse data relocation procedure increases relative to the first latency associated with the dense data relocation procedure. Additionally, the value of $C_{std}$ may generally be less than the value of $C_I$. However, as the value of $C_{std}$ increases, the second latency increases relative to the first latency, as the value of $C_I$ may remain relatively static. Accordingly, as a quantity of pages of a dynamic block 215 that contain valid data increases, the dense data relocation procedure may become increasingly faster relative to the sparse data relocation procedure. As an example, a defragmentation operation performed on a B16C NAND device using the dense data relocation procedure may be approximately 2.5 times faster than using the sparse data relocation procedure. Accordingly, using the dense data relocation procedure may reduce latency associated with performing data relocation operations.

In some examples, the data relocation operation may be associated with the virtual block 205. Here, the controller may independently select a procedure to perform the data relocation operation for each dynamic block 215 of the virtual block 205. For example, the controller may select the dense data relocation procedure to perform the data relocation operation on the dynamic block 215-a and the dynamic block 215-c and the sparse data relocation procedure to perform the data relocation operation on the dynamic block 215-b. The controller may select the corresponding procedure to perform the data relocation operation on a respective dynamic block 215 based on or in response to whether one or more parameters associated with data relocation operation for the respective dynamic block 215 satisfy one or more associated thresholds. In this way, the controller may implement a unified data relocation approach that selects procedures to perform data relocation operations on a per dynamic block basis.

Figure 3:
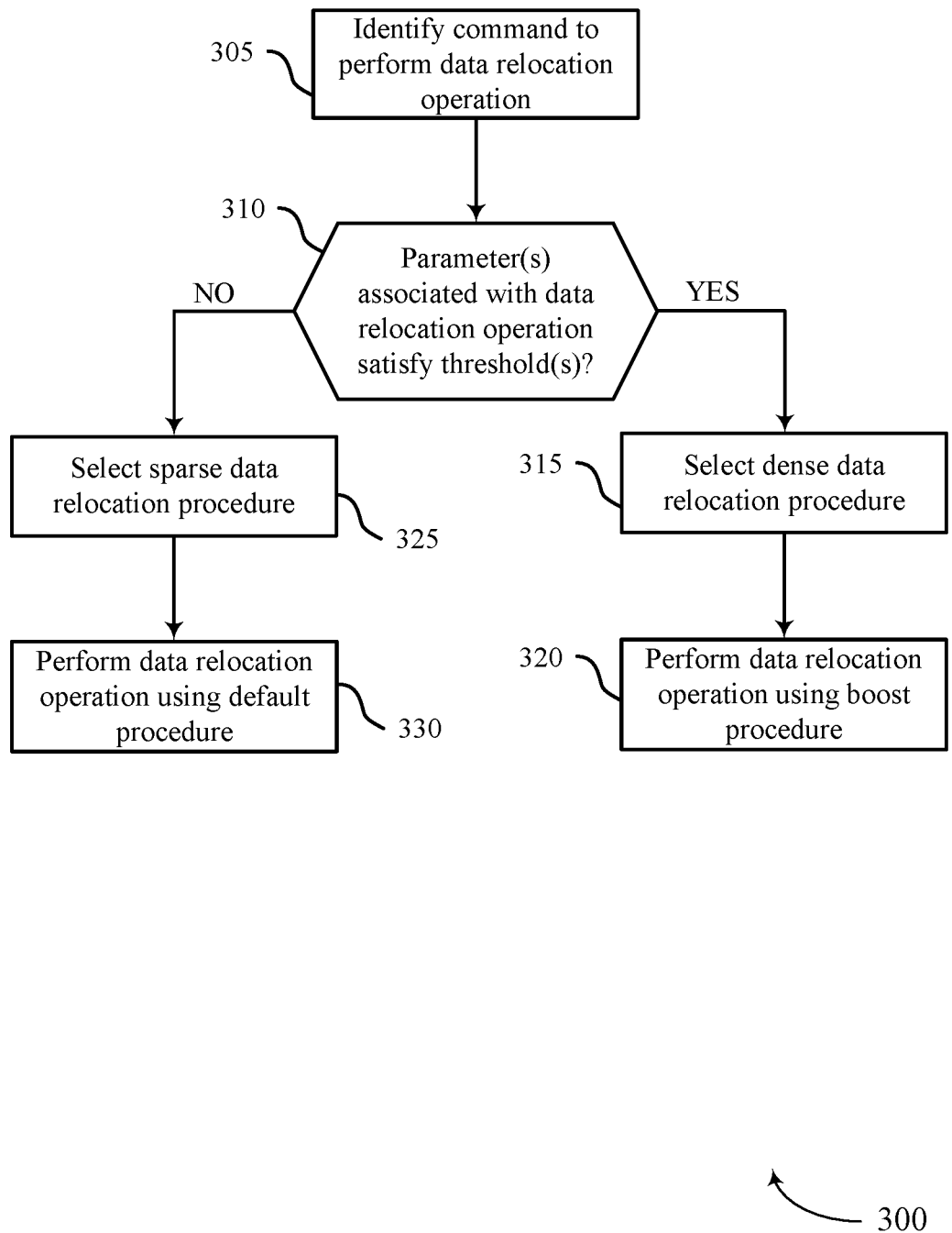
FIG. 3 illustrates an example of a process flow that supports data relocation operation techniques in accordance with examples as disclosed herein.

FIG. 3 illustrates an example of a process flow 300 that supports data relocation operation techniques in accordance with examples as disclosed herein. Process flow 300 may be performed by components of a memory system, such as memory system 110 described with reference to FIG. 1. For example, process flow 300 may be performed by a controller of a memory system or a memory device (or both) such as a memory system controller 115 or a local controller 135 as described with reference to FIG. 1. Process flow 300 may depict a process for selecting a procedure for performing a data relocation operation and performing the data relocation operation using the selected procedure that may be implemented to reduce latency and power consumption and increase system performance, among other benefits. Aspects of the process flow 300 may be implemented by a controller, among other components. Additionally or alternatively, aspects of the process flow 300 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 300.

In the following description of the process flow 300, the operations may be performed in different orders or at different times. Some operations may also be omitted from the process flow 300, and other operations may be added to the process flow 300.

At 305, a command to perform a data relocation operation may be identified. For example, the controller may identify a command to perform the data relocation operation, where the data relocation operation is associated with a dynamic block (e.g., a dynamic block 215) of a memory device (e.g., a non-volatile memory device including non-volatile memory cells) coupled with the controller. To identify the command, in some examples, the controller may receive the command from a host system coupled with the controller. In some other examples, to identify the command, the controller may initiate the data relocation operation.

At 310, one or more parameters associated with the data relocation operation may be evaluated as to whether the one or more parameters satisfy associated one or more thresholds. Examples of the one or more parameters associated with the data relocation operation may include a percentage of pages of the dynamic block containing valid data, a latency associated with the data relocation operation, a type of the data relocation operation, a state of the host system coupled with the controller, a quantity of pages of the dynamic block containing valid data, or any combination thereof.

The controller may determine whether the one or more parameters satisfy one or more associated thresholds. For example, the controller may determine whether a percentage of pages of the dynamic block containing valid data satisfies a threshold valid page percentage (e.g., 80 percent of the pages of the dynamic block are valid pages, or some other threshold valid page percentage), whether a latency associated the data relocation operation satisfies a threshold latency (e.g., whether a latency associated with the performing the data relocation operation using a sparse data relocation procedure satisfies a threshold latency, whether a latency associated with the performing the data relocation operation using a dense data relocation procedure satisfies a threshold latency), whether the type of the data relocation is a particular type of data relocation operation (e.g., whether the type corresponds to a foreground operation, a background operation, or some other type of operation), whether a host system is in an idle state, whether a quantity of pages of the dynamic block containing valid data satisfies a threshold valid page quantity, or a combination thereof.

The controller may maintain a counter to determine whether the percentage of pages of the dynamic block containing valid data satisfies the threshold valid page percentage or whether the quantity of pages of the dynamic block containing valid data satisfies the threshold valid page quantity, or both. For example, the controller may generate, maintain, and store a counter that tracks a quantity of pages of the dynamic block that contain valid data. The controller may compare the quantity of pages containing valid data indicated by the counter to a total quantity of pages of the dynamic block to calculate the percentage of pages of the dynamic block that contain valid date. The controller may then compare the calculated percentage to the threshold valid page percentage to determine whether the calculated percentage satisfies the threshold valid page percentage. Additionally, or alternatively, the controller may compare the quantity of pages of the dynamic block that contain valid data indicated by the counter to the threshold valid page quantity to determine whether the quantity of pages of the dynamic block that contain valid data satisfies the threshold valid page quantity. In some examples, the counter may be referred to as a dynamic valid page counter.

If, at 310, the controller determines that the one or more parameters satisfy the associated one or more thresholds, the controller may perform 315 and 320 as follows. For example, if the controller determines that the percentage of pages of the dynamic block containing valid data is greater than (e.g., or equal to) the threshold valid page percentage, performing the data relocation operation using a sparse data relocation procedure will not satisfy a latency threshold, the data relocation operation is associated with a foreground operation, the host system is in a state other than an idle state, the quantity of pages of the dynamic block containing valid data is greater than (e.g., or equal to) the threshold valid page quantity, or a combination thereof, the controller may perform 315 and 320, as follows.

At 315, the dense data relocation procedure may be selected. For example, the controller may select the dense data relocation procedure to perform the data relocation operation based on or in response to determining whether (e.g., determining that) the one or more parameters satisfy the associated one or more thresholds.

At 320, the data relocation operation may be performed using the dense data relocation procedure, as described with reference to FIG. 2. For example, to perform the data relocation operation using the dense data relocation procedure, the controller may read data stored at the dynamic block associated with the data relocation operation and write, to a second dynamic block, the data read from the dynamic block. In some examples, the dynamic block may include both valid pages and invalid pages. Here, the controller may write both valid data of the valid pages and invalid data of the invalid pages to the second dynamic block.

If, at 310, the controller determines that the one or more parameters do not satisfy the associated one or more thresholds, the controller may perform 325 and 330 as follows. For example, if the controller determines that the percentage of pages of the dynamic block containing valid data is less than (e.g., or equal to) the threshold valid page percentage, performing the data relocation operation using a sparse data relocation procedure will satisfy a latency threshold, the data relocation operation is associated with a background operation, the host system is in an idle state, the quantity of pages of the dynamic block containing valid data is less than (e.g., or equal to) the threshold valid page quantity, or a combination thereof, the controller may perform 325 and 330, as follows.

At 325, the sparse data relocation procedure may be selected. For example, the controller may select the sparse data relocation procedure to perform the data relocation operation based on or in response to determining whether (e.g., determining that) the one or more parameters do not satisfy the associated one or more thresholds.

At 330, the data relocation operation may be performed using the sparse data relocation procedure, as described with reference to FIG. 2. For example, to perform the data relocation operation using the sparse data relocation procedure, the controller may write pages of the dynamic block that contain valid data to a second dynamic block. Here, the controller may refrain from writing pages of the dynamic block that contain invalid data to the second dynamic block. Additionally, the controller may update a mapping that indicates relationships between logical addresses and physical addresses (e.g., a PPT, an $L_2P$ table, or some other logical to physical mapping) to map logical addresses associated with the pages written to the second dynamic block to corresponding physical addresses of the second dynamic block.

Figure 4:
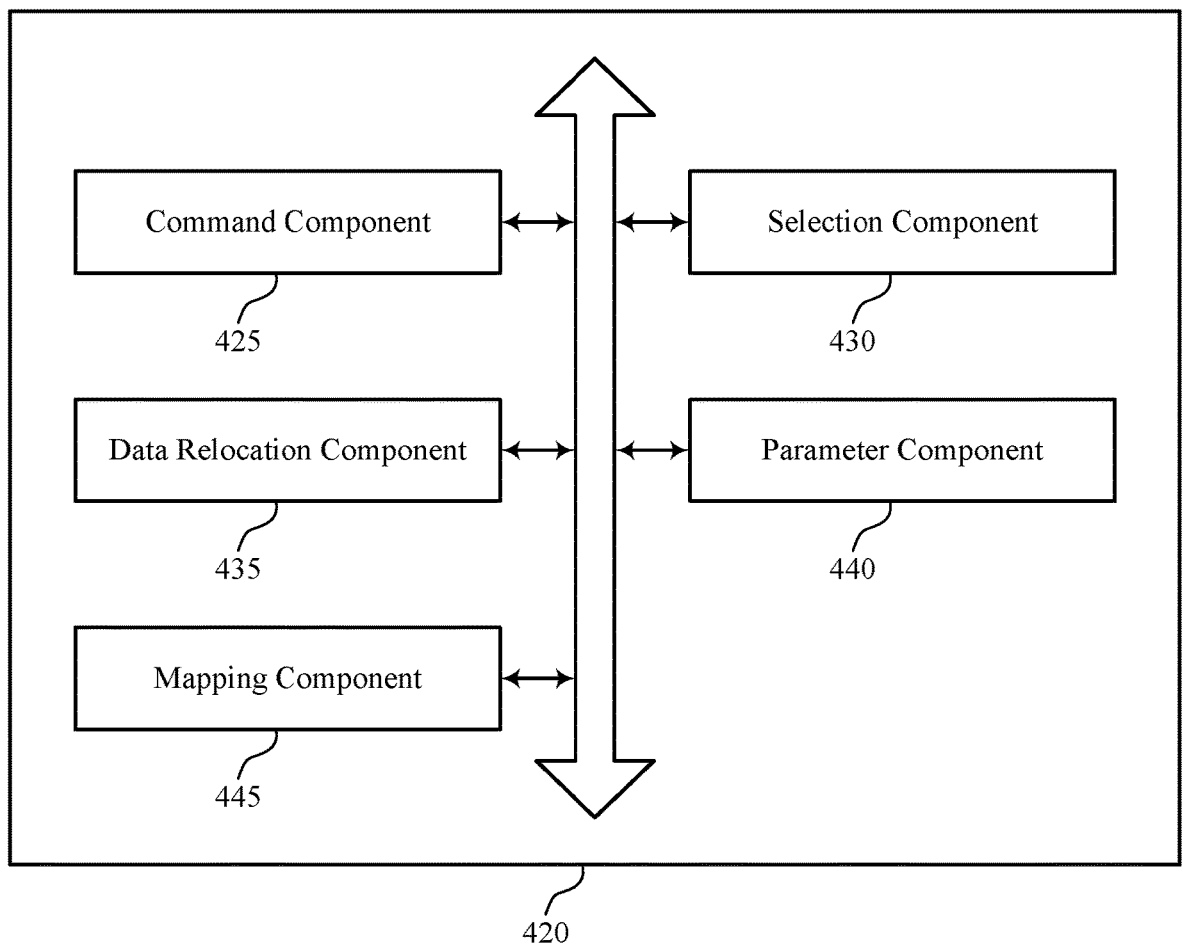
FIG. 4 shows a block diagram of a memory system that supports data relocation operation techniques in accordance with examples as disclosed herein.

FIG. 4 shows a block diagram 400 of a memory system 420 that supports data relocation operation techniques in accordance with examples as disclosed herein. The memory system 420 may be an example of aspects of a memory system as described with reference to FIGS. 1 through 3. The memory system 420, or various components thereof, may be an example of means for performing various aspects of data relocation operation techniques as described herein. For example, the memory system 420 may include a command component 425, a selection component 430, a data relocation component 435, a parameter component 440, a mapping component 445, or any combination thereof. Each of these components may communicate, directly or indirectly, with one another (e.g., via one or more buses).

The command component 425 may be configured as or otherwise support a means for identifying a command to perform a data relocation operation associated with a block of memory cells of the memory system. The selection component 430 may be configured as or otherwise support a means for selecting between a first procedure for performing the data relocation operation and a second procedure for performing the data relocation operation based at least in part on whether one or more parameters associated with the data relocation operation satisfy a threshold. The data relocation component 435 may be configured as or otherwise support a means for performing the data relocation operation using the first procedure or the second procedure based at least in part on identifying the command and selecting between the first procedure and the second procedure.

In some examples, the parameter component 440 may be configured as or otherwise support a means for determining whether the one or more parameters satisfy the threshold. In some examples, the selection component 430 may be configured as or otherwise support a means for selecting the first procedure based at least in part on determining that the one or more parameters satisfy the threshold. In some examples, the data relocation component 435 may be configured as or otherwise support a means for performing the data relocation operation using the first procedure based at least in part on selecting the first procedure.

In some examples, to support performing the data relocation operation using the first procedure, the data relocation component 435 may be configured as or otherwise support a means for reading data stored at the block of memory cells. In some examples, to support performing the data relocation operation using the first procedure, the data relocation component 435 may be configured as or otherwise support a means for writing, to a second block of memory cells, the data read from the block of memory cells.

In some examples, the block of memory cells may include one or more pages associated with valid data and one or more pages associated with invalid data, and the data relocation component 435 may be configured as or otherwise support a means for writing the one or more pages associated with valid data and the one or more pages associated with invalid data to the second block of memory cells based at least in part on performing the data relocation operation using the first procedure.

In some examples, the mapping component 445 may be configured as or otherwise support a means for updating a first entry of a mapping that maps indices associated with blocks of memory cells to groups of blocks of memory cells based at least in part on performing the data relocation operation using the first procedure, the updated first entry including a first index associated with the second block of memory cells, a second index associated with a first group of blocks of memory cells including the second block of memory cells, and an offset of the second block of memory cells within the first group of blocks of memory cells.

In some examples, the mapping component 445 may be configured as or otherwise support a means for refraining from updating a mapping that indicates relationships between logical addresses and physical addresses based at least in part on performing the data relocation operation using the first procedure.

In some examples, to support determining whether the one or more parameters satisfy the threshold, the parameter component 440 may be configured as or otherwise support a means for maintaining a counter associated with the block of memory cells that tracks a quantity of pages of the block of memory cells that are associated with valid data. In some examples, to support determining whether the one or more parameters satisfy the threshold, the parameter component 440 may be configured as or otherwise support a means for determining whether the quantity of pages of the block of memory cells that are associated with valid data satisfies a threshold quantity of pages associated with valid data.

In some examples, the parameter component 440 may be configured as or otherwise support a means for determining whether the one or more parameters do not satisfy the threshold. In some examples, the selection component 430 may be configured as or otherwise support a means for selecting the second procedure based at least in part on determining that the one or more parameters do not satisfy the threshold. In some examples, the data relocation component 435 may be configured as or otherwise support a means for performing the data relocation operation using the second procedure based at least in part on selecting the second procedure.

In some examples, to support performing the data relocation operation using the second procedure, the data relocation component 435 may be configured as or otherwise support a means for writing pages of the block of memory cells that are associated with valid data to a second block of memory cells. In some examples, to support performing the data relocation operation using the second procedure, the mapping component 445 may be configured as or otherwise support a means for updating a mapping that indicates relationships between logical addresses and physical addresses to map logical addresses associated with the pages written to the second block of memory cells to corresponding physical addresses of the second block of memory cells.

In some examples, the command component 425 may be configured as or otherwise support a means for receiving the command to perform the data relocation operation from a host system coupled with the memory system, where identifying the command to perform the data relocation operation is based at least in part on receiving the command to perform the data relocation operation from the host system.

In some examples, the data relocation component 435 may be configured as or otherwise support a means for initiating, by the memory system, the data relocation operation, where identifying the command to perform the data relocation operation is based at least in part on initiating the data relocation operation.

In some examples, the one or more parameters associated with the data relocation operation include a percentage of pages of the block of memory cells including valid data, a latency associated with the data relocation operation, a type of the data relocation operation, a state of a host system coupled with the memory system, or any combination thereof.

In some examples, a non-volatile memory device of the memory system includes the block of memory cells.

Figure 5:
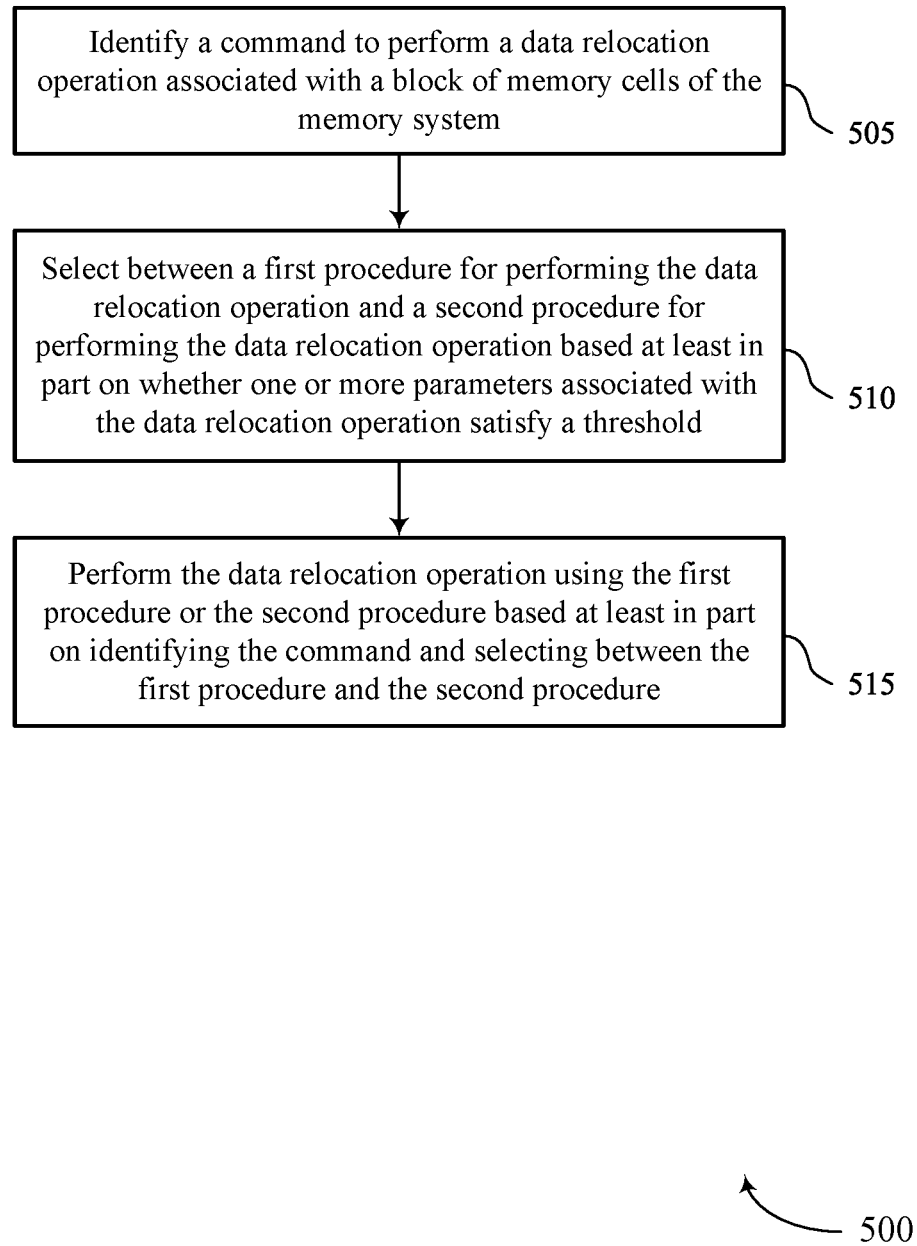
FIG. 5 shows a flowchart illustrating a method or methods that support data relocation operation techniques in accordance with examples as disclosed herein.

FIG. 5 shows a flowchart illustrating a method 500 that supports data relocation operation techniques in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include identifying a command to perform a data relocation operation associated with a block of memory cells of the memory system. The operations of 505 may be performed in accordance with examples as disclosed herein. In some examples, aspects of the operations of 505 may be performed by a command component 425 as described with reference to FIG. 4.

At 510, the method may include selecting between a first procedure for performing the data relocation operation and a second procedure for performing the data relocation operation based at least in part on whether one or more parameters associated with the data relocation operation satisfy a threshold. The operations of 510 may be performed in accordance with examples as disclosed herein. In some examples, aspects of the operations of 510 may be performed by a selection component 430 as described with reference to FIG. 4.

At 515, the method may include performing the data relocation operation using the first procedure or the second procedure based at least in part on identifying the command and selecting between the first procedure and the second procedure. The operations of 515 may be performed in accordance with examples as disclosed herein. In some examples, aspects of the operations of 515 may be performed by a data relocation component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for identifying a command to perform a data relocation operation associated with a block of memory cells of the memory system, selecting between a first procedure for performing the data relocation operation and a second procedure for performing the data relocation operation based at least in part on whether one or more parameters associated with the data relocation operation satisfy a threshold, and performing the data relocation operation using the first procedure or the second procedure based at least in part on identifying the command and selecting between the first procedure and the second procedure.

Some examples of the method 500 and the apparatus described herein may further include operations, features, circuitry, logic, means, or instructions for determining whether the one or more parameters satisfy the threshold, where selecting between the first procedure and the second procedure includes selecting the first procedure based at least in part on determining that the one or more parameters satisfy the threshold, and performing the data relocation operation using the first procedure or the second procedure includes performing the data relocation operation using the first procedure based at least in part on selecting the first procedure.

In some examples of the method 500 and the apparatus described herein, performing the data relocation operation using the first procedure may include operations, features, circuitry, logic, means, or instructions for reading data stored at the block of memory cells and writing, to a second block of memory cells, the data read from the block of memory cells.

In some examples of the method 500 and the apparatus described herein, the block of memory cells may include one or more pages associated with valid data and one or more pages associated with invalid data, and the method, apparatuses, and non-transitory computer-readable medium may include further operations, features, circuitry, logic, means, or instructions for writing the one or more pages associated with valid data and the one or more pages associated with invalid data to the second block of memory cells based at least in part on performing the data relocation operation using the first procedure.

Some examples of the method 500 and the apparatus described herein may further include operations, features, circuitry, logic, means, or instructions for updating a first entry of a mapping that maps indices associated with blocks of memory cells to groups of blocks of memory cells based at least in part on performing the data relocation operation using the first procedure, the updated first entry including a first index associated with the second block of memory cells, a second index associated with a first group of blocks of memory cells including the second block of memory cells, and an offset of the second block of memory cells within the first group of blocks of memory cells.

Some examples of the method 500 and the apparatus described herein may further include operations, features, circuitry, logic, means, or instructions for refraining from updating a mapping that indicates relationships between logical addresses and physical addresses based at least in part on performing the data relocation operation using the first procedure.

In some examples of the method 500 and the apparatus described herein, determining whether the one or more parameters satisfy the threshold may include operations, features, circuitry, logic, means, or instructions for maintaining a counter associated with the block of memory cells that tracks a quantity of pages of the block of memory cells that may be associated with valid data and determining whether the quantity of pages of the block of memory cells that may be associated with valid data satisfies a threshold quantity of pages associated with valid data.

Some examples of the method 500 and the apparatus described herein may further include operations, features, circuitry, logic, means, or instructions for determining whether the one or more parameters do not satisfy the threshold, where selecting between the first procedure and the second procedure includes selecting the second procedure based at least in part on determining that the one or more parameters do not satisfy the threshold, and performing the data relocation operation using the first procedure or the second procedure includes performing the data relocation operation using the second procedure based at least in part on selecting the second procedure.

In some examples of the method 500 and the apparatus described herein, performing the data relocation operation using the second procedure may include operations, features, circuitry, logic, means, or instructions for writing pages of the block of memory cells that may be associated with valid data to a second block of memory cells and updating a mapping that indicates relationships between logical addresses and physical addresses to map logical addresses associated with the pages written to the second block of memory cells to corresponding physical addresses of the second block of memory cells.

Some examples of the method 500 and the apparatus described herein may further include operations, features, circuitry, logic, means, or instructions for receiving the command to perform the data relocation operation from a host system coupled with the memory system, where identifying the command to perform the data relocation operation may be based at least in part on receiving the command to perform the data relocation operation from the host system.

Some examples of the method 500 and the apparatus described herein may further include operations, features, circuitry, logic, means, or instructions for initiating, by the memory system, the data relocation operation, where identifying the command to perform the data relocation operation may be based at least in part on initiating the data relocation operation.

In some examples of the method 500 and the apparatus described herein, the one or more parameters associated with the data relocation operation include a percentage of pages of the block of memory cells including valid data, a latency associated with the data relocation operation, a type of the data relocation operation, a state of a host system coupled with the memory system, or any combination thereof.

In some examples of the method 500 and the apparatus described herein, a non-volatile memory device of the memory system includes the block of memory cells.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory system, a controller coupled with the memory system and operable to cause the apparatus to: identify a command to perform a data relocation operation associated with a block of memory cells of the memory system, select between a first procedure for performing the data relocation operation and a second procedure for performing the data relocation operation based at least in part on whether one or more parameters associated with the data relocation operation satisfy a threshold, and perform the data relocation operation using the first procedure or the second procedure based at least in part on identifying the command and selecting between the first procedure and the second procedure In some examples of the apparatus, the controller may be further configured to cause the apparatus to determine whether the one or more parameters associated with the data relocation operation satisfy the threshold, where selecting between the first procedure and the second procedure includes selecting the first procedure based at least in part on determining that the one or more parameters satisfy the threshold, and performing the data relocation operation using the first procedure or the second procedure includes performing the data relocation operation using the first procedure based at least in part on selecting the first procedure.

In some examples of the apparatus, to perform the data relocation operation using the first procedure, the controller may be further configured to cause the apparatus to read data stored at the block of memory cells and write, to a second block of memory cells, the data read from the block of memory cells.

In some examples of the apparatus, the block of memory cells includes one or more pages associated with valid data and one or more pages associated with invalid data and the controller may be further configured to cause the apparatus to write the one or more pages associated with valid data and the one or more pages associated with invalid data to the second block of memory cells based at least in part on performing the data relocation operation using the first procedure.

In some examples of the apparatus, the controller may be further configured to cause the apparatus to update a first entry of a mapping that maps indices associated with blocks of memory cells to groups of blocks of memory cells based at least in part on performing the data relocation operation using the first procedure, the updated first entry including a first index associated with the second block of memory cells, a second index associated with a first group of blocks of memory cells including the second block of memory cells, and an offset of the second block of memory cells within the first group of blocks of memory cells.

In some examples of the apparatus, the controller may be further configured to cause the apparatus to refrain from updating a mapping that indicates relationships between logical addresses and physical addresses based at least in part on performing the data relocation operation using the first procedure.

In some examples of the apparatus, to determine whether the one or more parameters satisfy the threshold, the controller may be further configured to cause the apparatus to maintain a counter associated with the block of memory cells that tracks a quantity of pages of the block of memory cells that may be associated with valid data and determine whether the quantity of pages of the block of memory cells that may be associated with valid data satisfies a threshold quantity of pages associated with valid data.

In some examples of the apparatus, the controller may be further configured to cause the apparatus to determine whether the one or more parameters do not satisfy the threshold, where selecting between the first procedure and the second procedure includes selecting the second procedure based at least in part on determining that the one or more parameters do not satisfy the threshold, and performing the data relocation operation using the first procedure or the second procedure includes performing the data relocation operation using the second procedure based at least in part on selecting the second procedure.

In some examples of the apparatus, to perform the data relocation operation using the second procedure, the controller may be further configured to cause the apparatus to write pages of the block of memory cells that may be associated with valid data to a second block of memory cells and update a mapping that indicates relationships between logical addresses and physical addresses to map logical addresses associated with the pages written to the second block of memory cells to corresponding physical addresses of the second block of memory cells.

In some examples of the apparatus, the controller may be further configured to cause the apparatus to receive the command to perform the data relocation operation from a host system coupled with the memory system, where identifying the command to perform the data relocation operation may be based at least in part on receiving the command to perform the data relocation operation from the host system.

In some examples of the apparatus, the controller may be further configured to cause the apparatus to initiate, by the memory system, the data relocation operation, where identifying the command to perform the data relocation operation may be based at least in part on initiating the data relocation operation.

In some examples of the apparatus, the one or more parameters associated with the data relocation operation include a percentage of pages of the block of memory cells including valid data, a latency associated with the data relocation operation, a type of the data relocation operation, a state of a host system coupled with the memory system, or any combination thereof.

In some examples of the apparatus, a non-volatile memory device of the memory system includes the block of memory cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices;
   a virtual block comprising a plurality of dynamic blocks of memory cells; and
   processing circuitry coupled with the one or more memory devices and operable to cause the memory system to:
   select, for each dynamic block of memory cells of the virtual block, between a first procedure for performing a data relocation operation and a second procedure for performing the data relocation operation based at least in part on whether one or more respective parameters associated with the data relocation operation satisfy a threshold, the one or more respective parameters associated with a corresponding dynamic block of memory cells of the plurality of dynamic blocks of memory cells; and
   perform a plurality of data relocation operations, each data relocation operation associated with a respective corresponding dynamic block of memory cells and performed according to one of the first procedure or the second procedure based at least in part on selecting between the first procedure and the second procedure for each respective dynamic block of memory cells.

2. The memory system of claim 1, wherein the processing circuitry is further operable to cause the memory system to:
   determine, for each respective dynamic block of memory cells of the virtual block, whether the one or more respective parameters satisfy a respective threshold.

3. The memory system of claim 2, wherein, to determine whether the one or more respective parameters satisfy the respective threshold, the processing circuitry is operable to cause the memory system to:
   determine, for a first dynamic block of memory cells of the plurality of dynamic blocks of memory cells, whether one or more first parameters associated with the first dynamic block of memory cells satisfy a first threshold; and
   determine, for a second dynamic block of memory cells of the plurality of dynamic blocks of memory cells, whether one or more second parameters associated with the second dynamic block of memory cells satisfy a second threshold.

4. The memory system of claim 3, wherein, to select between the first procedure for performing the data relocation operation and the second procedure for performing the data relocation operation, the processing circuitry is operable to cause the memory system to:
   select, for the first dynamic block of memory cells, the first procedure based at least in part on determining that the one or more first parameters satisfy the threshold; and
   select, for the second dynamic block of memory cells, the second procedure based at least in part on determining whether the one or more second parameters satisfy the threshold.

5. The memory system of claim 2, wherein, to determine whether the one or more respective parameters satisfy the respective threshold, the processing circuitry is operable to cause the memory system to:
   maintain a respective counter associated with each dynamic block of memory cells of the virtual block that tracks a respective quantity of pages of each dynamic block of memory cells that are associated with valid data; and
   determine whether the respective quantity of pages of each dynamic block of memory cells satisfies a threshold quantity.

6. The memory system of claim 1, wherein the processing circuitry is further operable to cause the memory system to:
   determine, for each dynamic block of memory cells of the virtual block, whether to update a respective mapping that indicates relationships between logical addresses and physical addresses based at least in part on whether a respective data relocation operation of the plurality of data relocation operations is performed using the first procedure or the second procedure.

7. The memory system of claim 6, wherein the processing circuitry is further operable to cause the memory system to:
   refrain from updating a first mapping associated with pages written to a first dynamic block of memory cells of the plurality of dynamic blocks of memory cells based at least in part on a first data relocation operation associated with the first dynamic block of memory cells being performed using the first procedure; and
   update a second mapping associated with pages written to a second dynamic block of memory cells of the plurality of dynamic blocks of memory cells based at least in part on a second data relocation operation associated with the second dynamic block of memory cells being performed using the second procedure.

8. The memory system of claim 1, wherein the processing circuitry is further operable to cause the memory system to:
   determine, for each dynamic block of memory cells of the virtual block, whether to update a respective mapping that maps indices associated with dynamic blocks of memory cells to groups of dynamic blocks of memory cells based at least in part on whether a respective data relocation operation of the plurality of data relocation operations is performed using the first procedure or the second procedure.

9. The memory system of claim 1, wherein the processing circuitry is further operable to cause the memory system to:
   receive a command to perform the plurality of data relocation operations from a host system coupled with the memory system.

10. The memory system of claim 1, the one or more respective parameters associated with the data relocation operation comprise a percentage of pages of a respective dynamic block of memory cells comprising valid data, a latency associated with the data relocation operation, a type of the data relocation operation, a state of a host system coupled with the memory system, or any combination thereof.

11. A non-transitory computer-readable medium storing code comprising instructions which, when executed by one or more processors of an electronic device, cause the electronic device to:
    select, for each dynamic block of memory cells of a virtual block comprising a plurality of dynamic blocks of memory cells, between a first procedure for performing a data relocation operation and a second procedure for performing the data relocation operation based at least in part on whether one or more respective parameters associated with the data relocation operation satisfy a threshold, the one or more respective parameters associated with a respective corresponding dynamic block of memory cells of the plurality of dynamic blocks of memory cells; and
    perform a plurality of data relocation operations, each data relocation operation associated with a respective corresponding dynamic block of memory cells and performed according to one of the first procedure or the second procedure based at least in part on selecting between the first procedure and the second procedure for each dynamic block of memory cells.

12. The non-transitory computer-readable medium of claim 11, wherein the instructions, when executed by the one or more processors, further cause the electronic device to:
    determine, for each dynamic block of memory cells of the virtual block, whether the one or more respective parameters satisfy a respective threshold.

13. The non-transitory computer-readable medium of claim 12, wherein the instructions to determine whether the one or more respective parameters satisfy the respective threshold, when executed by the one or more processors, further cause the electronic device to:
    determine, for a first dynamic block of memory cells of the plurality of dynamic blocks of memory cells, whether one or more first parameters associated with the first dynamic block of memory cells satisfy a first threshold; and
    determine, for a second dynamic block of memory cells of the plurality of dynamic blocks of memory cells, whether one or more second parameters associated with the second dynamic block of memory cells fail to satisfy a second threshold.

14. The non-transitory computer-readable medium of claim 13, wherein the instructions to select between the first procedure for performing the data relocation operation and the second procedure for performing the data relocation operation, when executed by the one or more processors, further cause the electronic device to:
   select, for the first dynamic block of memory cells, the first procedure based at least in part on determining that the one or more first parameters satisfy the threshold; and
   select, for the second dynamic block of memory cells, the second procedure based at least in part on determining that the one or more second parameters fail to satisfy the threshold.

15. The non-transitory computer-readable medium of claim 12, wherein the instructions to determine whether the one or more respective parameters satisfy the respective threshold, when executed by the one or more processors, further cause the electronic device to:
   maintain a respective counter associated with each dynamic block of memory cells of the virtual block that tracks a respective quantity of pages of each dynamic block of memory cells that are associated with valid data; and
   determine whether the respective quantity of pages of each dynamic block of memory cells satisfies a threshold quantity.

16. The non-transitory computer-readable medium of claim 11, wherein the instructions, when executed by the one or more processors, further cause the electronic device to:
   determine, for each dynamic block of memory cells of the virtual block, whether to update a respective mapping that indicates relationships between logical addresses and physical addresses based at least in part on whether a respective data relocation operation of the plurality of data relocation operations is performed using the first procedure or the second procedure.

17. The non-transitory computer-readable medium of claim 16, wherein the instructions, when executed by the one or more processors, further cause the electronic device to:
   refrain from updating a first mapping associated with pages written to a first dynamic block of memory cells of the plurality of dynamic blocks of memory cells based at least in part on a first data relocation operation associated with the first dynamic block of memory cells being performed using the first procedure; and
   update a second mapping associated with pages written to a second dynamic block of memory cells of the plurality of dynamic blocks of memory cells based at least in part on a second data relocation operation associated with the second dynamic block of memory cells being performed using the second procedure.

18. The non-transitory computer-readable medium of claim 11, wherein the instructions, when executed by the one or more processors, further cause the electronic device to:
   determine, for each dynamic block of memory cells of the virtual block, whether to update a respective mapping that maps indices associated with dynamic blocks of memory cells to groups of dynamic blocks of memory cells based at least in part on whether a respective data relocation operation of the plurality of data relocation operations is performed using the first procedure or the second procedure.

19. The non-transitory computer-readable medium of claim 11, wherein the instructions, when executed by the one or more processors, further cause the electronic device to:
   receive a command to perform the plurality of data relocation operations from a host system coupled with the electronic device.

20. A method by a memory system, comprising:
   selecting, for each dynamic block of memory cells of a virtual block comprising a plurality of dynamic blocks of memory cells, between a first procedure for performing a data relocation operation and a second procedure for performing the data relocation operation based at least in part on whether one or more respective parameters associated with the data relocation operation satisfy a threshold, the one or more respective parameters associated with a respective corresponding dynamic block of memory cells of the plurality of dynamic blocks of memory cells; and
   performing a plurality of data relocation operations, each data relocation operation associated with a respective corresponding dynamic block of memory cells and performed according to one of the first procedure or the second procedure based at least in part on selecting between the first procedure and the second procedure for each dynamic block of memory cells.

* * * * *